US009767578B2

United States Patent
Motomura et al.

(10) Patent No.: US 9,767,578 B2
(45) Date of Patent: Sep. 19, 2017

(54) IMAGE MEASUREMENT DEVICE AND IMAGE MEASUREMENT METHOD

(71) Applicant: Panasonic Intellectual Property Management Co., Ltd., Osaka (JP)

(72) Inventors: Hideto Motomura, Kyoto (JP); Yoshikuni Sato, Fukui (JP); Yasuhiko Adachi, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 296 days.

(21) Appl. No.: 14/728,603

(22) Filed: Jun. 2, 2015

(65) Prior Publication Data

US 2015/0262384 A1 Sep. 17, 2015

Related U.S. Application Data

(63) Continuation of application No. PCT/JP2014/002971, filed on Jun. 4, 2014.

(30) Foreign Application Priority Data

Jul. 11, 2013 (JP) .................................. 2013-145889

(51) Int. Cl.
| | | |
|---|---|---|
| H04N 9/47 | (2006.01) | |
| H04N 7/18 | (2006.01) | |
| G06T 7/40 | (2017.01) | |
| G06T 7/00 | (2017.01) | |

(Continued)

(52) U.S. Cl.
CPC .......... *G06T 7/408* (2013.01); *G06K 9/00134* (2013.01); *G06T 7/0012* (2013.01);
(Continued)

(58) Field of Classification Search
CPC .................................. G06T 7/408; G06T 7/90
(Continued)

(56) References Cited

U.S. PATENT DOCUMENTS

| | | |
|---|---|---|
| 5,121,337 A | 6/1992 | Brown |
| 8,822,939 B2 | 9/2014 | Mochizuki et al. |

(Continued)

FOREIGN PATENT DOCUMENTS

| | | |
|---|---|---|
| JP | 6-502492 | 3/1994 |
| JP | 2004-286666 | 10/2004 |

(Continued)

OTHER PUBLICATIONS

International Search Report issued in International Application No. PCT/JP2014/002971 on Sep. 2, 2014.

*Primary Examiner* — Hung Dang
*Assistant Examiner* — Girumsew Wendmagegn
(74) *Attorney, Agent, or Firm* — Wenderoth, Lind & Ponack, L.L.P.

(57) ABSTRACT

An image measurement device including: light sources that irradiate light beams having different peak wavelengths; a staining method obtaining unit which obtains information indicating a staining method of an inspection specimen; an image obtaining unit which: selects a combination of light sources according to the staining method, based on illumination information; and capture inspection images of the inspection specimen with light beams from the selected light sources, and capture reference images of a reference specimen with light beams from the respective light sources; a calculating unit which calculates a positivity based on the inspection images; and an evaluation unit which associates the staining method of the reference specimen with the combination of light sources to generate the illumination information based on a total value of coefficients in a linear sum of the ortho-normalization base vectors of a spectral distribution of light sources calculated based on the reference images.

7 Claims, 13 Drawing Sheets

(51) Int. Cl.
  *G06K 9/00* (2006.01)
  *G06T 7/90* (2017.01)
  *G06K 9/20* (2006.01)

(52) U.S. Cl.
  CPC .............. *G06T 7/90* (2017.01); *G06K 9/2018* (2013.01); *G06T 2207/10024* (2013.01); *G06T 2207/10056* (2013.01); *G06T 2207/10152* (2013.01); *G06T 2207/30024* (2013.01)

(58) Field of Classification Search
  USPC ......................................................... 348/79
  See application file for complete search history.

(56) References Cited

U.S. PATENT DOCUMENTS

| | | |
|---|---|---|
| 2007/0139638 A1* | 6/2007 | Wolpert .................... G01J 3/18 356/39 |
| 2010/0054560 A1 | 3/2010 | Yamashita et al. |
| 2010/0201800 A1 | 8/2010 | Yamamoto et al. |
| 2012/0154353 A1 | 6/2012 | Mochizuki et al. |
| 2013/0099093 A1 | 4/2013 | Kawanabe et al. |
| 2014/0078285 A1 | 3/2014 | Mitsui |
| 2014/0105480 A1 | 4/2014 | Motomura et al. |
| 2014/0367555 A1 | 12/2014 | Motomura et al. |

FOREIGN PATENT DOCUMENTS

| | | |
|---|---|---|
| JP | 2010-181833 | 8/2010 |
| JP | 2012-129425 | 7/2012 |
| JP | 2013-3386 | 1/2013 |
| JP | 2013-089869 | 5/2013 |
| WO | 92/07275 | 4/1992 |
| WO | 2008/108059 | 9/2008 |
| WO | 2012/157419 | 11/2012 |
| WO | 2013/179581 | 12/2013 |
| WO | 2014/083743 | 6/2014 |

* cited by examiner

| Rank | LED number | | | | | Evaluation value q |
|---|---|---|---|---|---|---|
| | 1 | 2 | 3 | 4 | 5 | |
| 1 | 4 | 6 | 9 | 12 | 14 | 0.92 |
| 2 | 3 | 7 | 10 | 13 | 14 | 0.86 |
| 3 | 4 | 7 | 9 | 12 | 14 | 0.79 |
| ⋮ | ⋮ | ⋮ | ⋮ | ⋮ | ⋮ | ⋮ |

IMAGE MEASUREMENT DEVICE AND IMAGE MEASUREMENT METHOD

CROSS REFERENCE TO RELATED APPLICATIONS

This is a continuation application of PCT International Application No. PCT/JP2014/002971 filed on Jun. 4, 2014, designating the United States of America, which is based on and claims priority of Japanese Patent Application No. 2013-145889 filed on Jul. 11, 2013. The entire disclosures of the above-identified applications, including the specifications, drawings and claims are incorporated herein by reference in their entirety.

FIELD

One or more exemplary embodiments disclosed herein relate generally to an image measurement device and an image measurement method which are used to support medical diagnoses and treatments.

BACKGROUND

Conventionally proposed image measurement techniques identify negative cell nuclei and positive cell nuclei through image processing using color information of images of a pathology specimen, and calculate a positivity indicating the number of positive cell nuclei or the percentage of the area of the positive cell nuclei with respect to the number of the whole cell nuclei or the percentage of the area of the whole cell nuclei composed of the negative cell nuclei and the positive cell nuclei (for example, see Patent Literature 1).

Furthermore, Patent Literature 2 discloses a technique that enables measurement of a spectral distribution that is color information of a pathology specimen itself without being affected by differences in input and output characteristics between cameras one of which captured the pathology specimen and the other captured another pathology specimen.

CITATION LIST

Patent Literature

[PTL 1]
PCT International Publication No. 2008/108059
[PTL 2]
Japanese Unexamined Patent Application Publication No. 2004-286666

SUMMARY

Technical Problem

However, the conventional techniques cannot absorb such color differences between the pathology specimens. The color of a pathology specimen is determined by various kinds of factors such as the concentration of a fixative solution, a fixing time, a staining time, a room temperature, a humidity, etc. in the generation of the pathology specimen. The color of a pathology specimen varies depending on a facility because a different facility for generating a pathology specimen uses a different reagent or device. For this reason, it is difficult to extract cell nuclei stably, and thus to calculate a positivity accurately.

Non-limiting and exemplary embodiments provide an image measurement device and an image measurement method for stably extracting specific targets such as positive nuclei and negative nuclei from pathology specimens while absorbing color differences between images of the pathology specimens made due to factors in the generation of the pathology specimens, and to thereby calculate a positivity appropriately.

Solution to Problem

In one general aspect, the techniques disclosed here feature an image measurement device according to an aspect of the present disclosure includes: an illumination unit including a plurality of light sources that irradiate light beams having different peak wavelengths; a staining method obtaining unit configured to obtain information indicating a staining method of an inspection pathology specimen; an image obtaining unit configured to: select a combination of light sources included in the plurality of light sources in the illumination unit according to the staining method indicated by the information obtained by the staining method obtaining unit, based on illumination information in which each of one or more staining methods including the staining method is associated with a corresponding one of one or more combinations of light sources including the combination of light sources; and capture inspection images of the inspection pathology specimen with light beams sequentially irradiated from the respective light sources in the selected combination, and capture reference images of a reference pathology specimen with light beams sequentially irradiated from the respective light sources included in the plurality of light sources; a calculating unit configured to calculate a positivity that is a percentage of positive cell nuclei in the inspection pathology specimen, based on the inspection images obtained by the image obtaining unit; an ortho-normalization unit configured to form a plurality of spectral distribution vectors from the reference images, and calculate an ortho-normalization base vector from the plurality of spectral distribution vectors; and an evaluation unit configured to associate the staining method of the reference pathology specimen with the combination of light sources to generate the illumination information, and store the illumination information in a recording medium, the combination of light sources having an evaluation value that exceeds a reference value or is largest among evaluation values of combinations of light sources in the illumination unit, each evaluation value being a total value of coefficients of ortho-normalization base vectors included in a linear sum of the ortho-normalization base vectors when a spectral distribution of the illumination unit is represented as the linear sum.

In one general aspect, the techniques disclosed here feature an image measurement method for capturing images using light beams irradiated from an illumination unit including a plurality of light sources that irradiate light beams having different peak wavelengths, the image measurement method including: obtaining information indicating a staining method of an inspection pathology specimen; selecting a combination of light sources included in the plurality of light sources in the illumination unit according to the staining method indicated by the information obtained in the obtaining, based on illumination information in which each of one or more staining methods including the staining method is associated with a corresponding one of one or more combinations of light sources including the combination of light sources; capturing inspection images of the inspection pathology specimen with light beams sequentially irradiated from the respective light sources in the selected combination, and capture reference images of a reference pathology specimen with light beams sequentially irradiated from the respective light sources included in the plurality of light sources; calculating a positivity that is a percentage of positive cell nuclei in the inspection pathology specimen, based on the inspection images obtained in the obtaining; forming a plurality of spectral distribution vectors from the reference images, and calculating an ortho-normalization base vector from the plurality of spectral distribution vectors; and associating the staining method of the reference pathology specimen with the combination of light sources to generate the illumination information, and storing the illumination information in a recording medium, the combination of light sources having an evaluation value that exceeds a reference value or is largest among evaluation values of combinations of light sources in the illumination unit, each evaluation value being a total value of coefficients of ortho-normalization base vectors included in a linear sum of the ortho-normalization base vectors when a spectral distribution of the illumination unit is represented as the linear sum.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

One or more exemplary embodiments or features disclosed herein make it possible to stably extract specific targets such as positive cell nuclei and negative cell nuclei, and to thereby calculate a positivity with a high accuracy.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
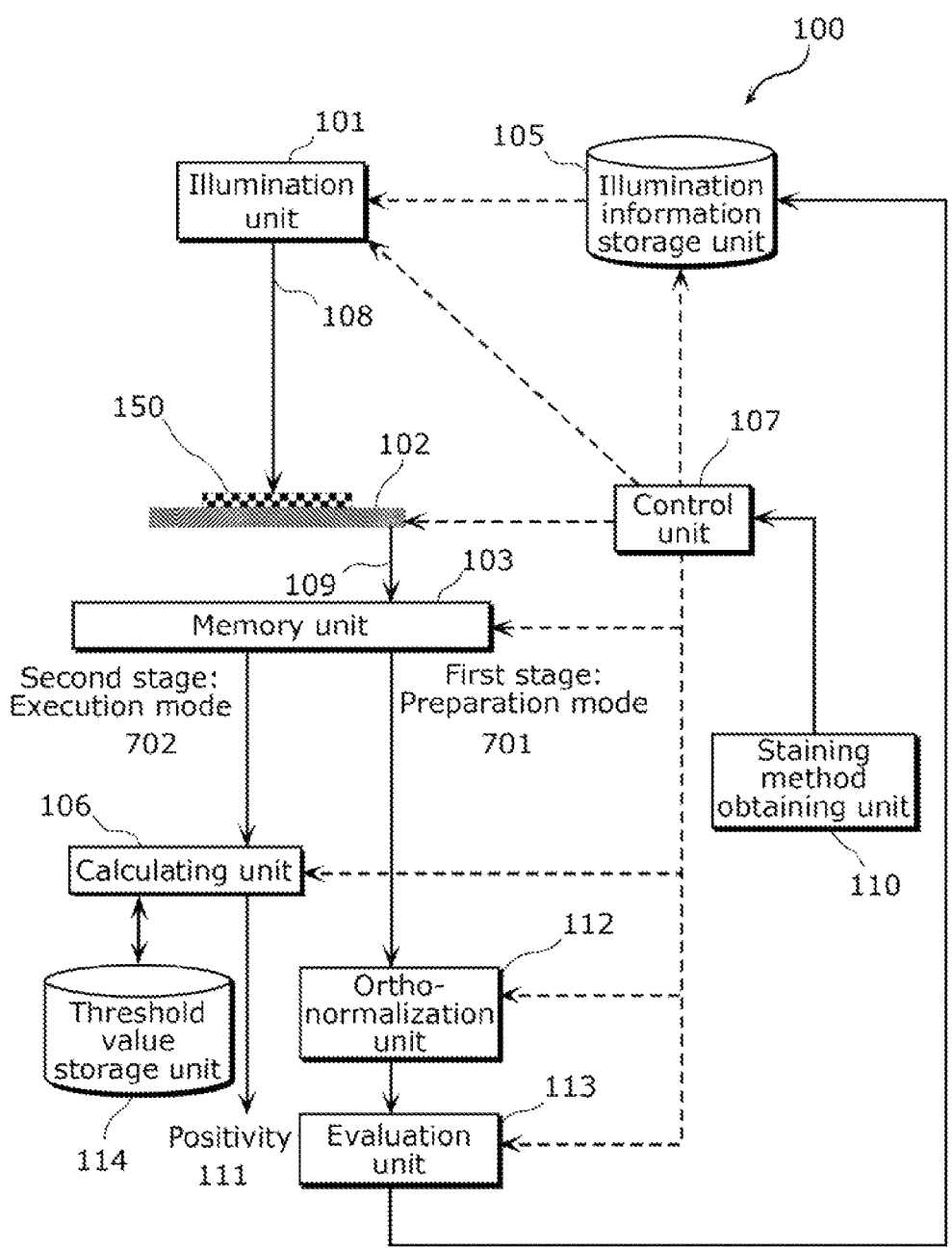
FIG. 1 is a block diagram of a configuration of an image measurement device according to Embodiment 1.

Underlying Knowledge Forming Basis of the Present Disclosure

Diagnostic processes aim to identify a disease name and check pathology, and a course of treatment is determined according to the disease name or the pathology. In order to make a definite diagnosis based on the disease name or the pathology, a pathological diagnosis is made by extracting a sample from a lesion and observing the state of the sample at a cell level. In the pathological diagnosis, a pathology specimen is prepared by slicing the extracted sample to be thin enough to be observed using a microscope. The pathology specimen is imaged via the microscope using a digital camera or a scanner, and the resulting digital image (image data) is stored and referred to.

Digital diagnostic images such as the above image are more compatible with data processing by computers than the images before being digitized, which increases opportunities for helping doctors or medical technologists make diagnoses using information technology (IT). Computer-aided detection (CAD) is one such example, and is a method for detecting a legion using a computer.

For example, an effect of an endocrine therapy for breast cancer can be evaluated based on an occupancy of positive cell nuclei with respect to the whole cell nuclei (hereinafter referred to as a "positivity") or the like. Positive cell nuclei are extracted by staining the whole cell nuclei, and include estrogen receptor (ER) positive cell nuclei, progesterone receptor (PgR) positive cell nuclei, and Ki-67 positive cell nuclei. Here, for example, a pathologist visually counts the number of cell nuclei using a microscope and the number of positive cell nuclei among the cell nuclei, and then calculates a positivity that is the occupancy of the positive cell nuclei with respect to the cell nuclei. However, visual counting may be a factor of overlooking, double counting, or the like, and thus may not be sufficiently reliable. Usually, the pathologist observes, using the microscope, several parts of a pathology specimen while moving a preparation that is the pathology specimen and enlarging the parts. Assuming that five hundred cell nuclei are counted in one visual field and the number of visual fields is four, the number of times of counting is two thousand. The work load may reduce an operation accuracy and may make a burden too heavy for the pathologist.

In view of this, Patent Literature 1 discloses a technique for identifying negative cell nuclei and positive cell nuclei through image processing using color information of a pathological image, and calculating a positivity. In other words, the technique separately extracts and count positive cell nuclei stained in brown and negative cell nuclei stained in blue, and calculates a positivity based on the values obtained by counting. The brown-stained positive cell nuclei and the blue-stained negative cell nuclei are extracted using color phase information, chrominance information, and luminance information.

However, the conventional techniques cannot absorb such color differences between the pathology specimens. The color of a pathology specimen is determined by various kinds of factors such as the concentration of a fixative solution, a fixing time, a staining time, a room temperature, a humidity, etc. in the generation of the pathology specimen. The color of a pathology specimen varies depending on a facility because a different facility for generating the pathology specimen uses a different reagent or device.

Prior to extraction of positive cell nuclei and negative cell nuclei using color information, there is a need to determine (i) a color phase representing brown and numerical ranges of chrominance and luminance thereof, and (ii) a color phase representing blue and numerical ranges of chrominance and luminance thereof. However, when the color of a target pathology specimen changes, it is impossible to stably extract the positive cell nuclei and negative cell nuclei accurately, and to thus calculate a positivity accurately.

According to an exemplary embodiment disclosed herein, an image measurement device according to an aspect of the present disclosure includes: an illumination unit including a plurality of light sources that irradiate light beams having different peak wavelengths; a staining method obtaining unit configured to obtain information indicating a staining method of an inspection pathology specimen; an image obtaining unit configured to: select a combination of light sources included in the plurality of light sources in the illumination unit according to the staining method indicated by the information obtained by the staining method obtaining unit, based on illumination information in which each of one or more staining methods including the staining method is associated with a corresponding one of one or more combinations of light sources including the combination of light sources; and capture inspection images of the inspection pathology specimen with light beams sequentially irradiated from the respective light sources in the selected combination, and capture reference images of a reference pathology specimen with light beams sequentially irradiated from the respective light sources included in the plurality of light sources; a calculating unit configured to calculate a positivity that is a percentage of positive cell nuclei in the inspection pathology specimen, based on the inspection images obtained by the image obtaining unit; an ortho-normalization unit configured to form a plurality of spectral distribution vectors from the reference images, and calculate an ortho-normalization base vector from the plurality of spectral distribution vectors; and an evaluation unit configured to associate the staining method of the reference pathology specimen with the combination of light sources to generate the illumination information, and store the illumination information in a recording medium, the combination of light sources having an evaluation value that exceeds a reference value or is largest among evaluation values of combinations of light sources in the illumination unit, each evaluation value being a total value of coefficients of ortho-normalization base vectors included in a linear sum of the ortho-normalization base vectors when a spectral distribution of the illumination unit is represented as the linear sum.

With this configuration, the combination of light sources necessary for capturing the images of the pathology specimen is selected according to the staining method of the pathology specimen. Thus, it is possible to select the combination of light sources suitable for the spectral distribution of the pathology specimen. For this reason, it is possible to stably identify the positive nuclei, negative nuclei, cytoplasms, etc. in the image, and to thereby calculate the positivity appropriately.

Here, the total value of the coefficients means a total of magnitudes of the coefficients, and conceptually covers a total that can be represented as, for example, a sum of squares of coefficients in consideration of positive and negative signs.

With this configuration, the spectral distribution vector is represented as the linear sum of the ortho-normalization base vectors. For this reason, a larger evaluation value indicating the total value of the coefficients of the ortho-normalization base vectors included in the linear sum is determined to represent a more accurate spectral distribution of the pathology specimen, among the spectral distributions each obtained using a combination of light sources in the illumination unit. For this reason, it is possible to determine the optimum combination of light sources suitable for the spectral distribution of the inspection pathology specimen by determining the combination of light sources based on the evaluation value.

In addition, the evaluation unit may be configured to associate the staining method of the reference pathology specimen with a combination having a smallest number of light sources among a plurality of the combinations of light sources having an evaluation value exceeding the reference value when generating the illumination information, and store the illumination information in the recording medium.

In this way, it is possible to reduce the number of light sources to be used to capture images of the inspection pathology specimen while maintaining the image quality of the images, and to thereby efficiently obtain the images (image data).

In addition, the ortho-normalization unit may be further configured to form a plurality of spectral distribution vectors from the inspection images obtained by the image obtaining unit, and calculate ortho-normalization base vectors from the plurality of spectral distribution vectors, and the evaluation unit may be further configured to calculate an evaluation value that is a total value of coefficients of the ortho-normalization base vectors included in a linear sum of the ortho-normalization base vectors, when a spectral distribution of the illumination unit is represented as the linear sum of the ortho-normalization base vectors calculated from the inspection images. The image measurement device may further include: a staining accuracy evaluation unit configured to determine whether or not a difference between the evaluation value calculated from the reference images and the evaluation value calculated from the inspection images is larger than a threshold value; and a control unit configured to transmit a process-stop instruction to each of the illumination unit, the image obtaining unit, and the calculating unit when the difference is larger than the threshold value.

Differences in the state of stains etc. between the inspection pathology specimen and those of the reference pathology specimen result in a difference in the evaluation values obtainable from the image data of both of the specimens. For this reason, when the difference in the evaluation values becomes larger than a threshold value, it is possible to determine that the difference indicates a staining failure, and to stop the processes by those three units. Accordingly, no inaccurate positivity is calculated as the result of the processes.

In addition, the ortho-normalization unit may be configured to form the spectral distribution vectors from the reference images and form the spectral distribution vectors from the inspection images, using significant bit data obtained by excluding data of a predetermined number of bits starting with a least significant bit in each of image pixel data of a corresponding one of the reference images and the inspection images.

Image data of a certain number of bits starting with the least significant bit are affected by fluctuation in the intensity of light beams and noise of image sensors. For this reason, it is possible to accurately calculate the positivity of the positive cell nuclei in the inspection pathology specimen by calculating the ortho-normalization base vectors using the most significant bits without using the data of the certain number of bits starting with the least significant bit, without being affected by such noise etc.

In addition, the image obtaining unit may include a photo-electric conversion element on which the inspection pathology specimen is mounted, and may be configured to obtain the inspection images by means of the photo-electric conversion element receiving light irradiated from the illumination unit and passed through the inspection pathology specimen.

With this configuration, it is possible to directly measure spectral distribution information of the inspection pathology specimen, and to thereby accurately calculate the positivity.

In one general aspect, the techniques disclosed here feature an image measurement method for capturing images using light beams irradiated from an illumination unit including a plurality of light sources that irradiate light beams having different peak wavelengths, the image measurement method including: obtaining information indicating a staining method of an inspection pathology specimen; selecting a combination of light sources included in the plurality of light sources in the illumination unit according to the staining method indicated by the information obtained in the obtaining, based on illumination information in which each of one or more staining methods including the staining method is associated with a corresponding one of one or more combinations of light sources including the combination of light sources; capturing inspection images of the inspection pathology specimen with light beams sequentially irradiated from the respective light sources in the selected combination, and capture reference images of a reference pathology specimen with light beams sequentially irradiated from the respective light sources included in the plurality of light sources; calculating a positivity that is a percentage of positive cell nuclei in the inspection pathology specimen, based on the inspection images obtained in the obtaining; forming a plurality of spectral distribution vectors from the reference images, and calculating an ortho-normalization base vector from the plurality of spectral distribution vectors; and associating the staining method of the reference pathology specimen with the combination of light sources to generate the illumination information, and storing the illumination information in a recording medium, the combination of light sources having an evaluation value that exceeds a reference value or is largest among evaluation values of combinations of light sources in the illumination unit, each evaluation value being a total value of coefficients of ortho-normalization base vectors included in a linear sum of the ortho-normalization base vectors when a spectral distribution of the illumination unit is represented as the linear sum.

In this way, the combination of light sources in the illumination unit which are necessary to capture the images of the pathology specimen is selected according to the staining method of the pathology specimen. Thus, it is possible to select the combination of light sources suitable for the spectral distribution of the pathology specimen, and to thereby calculate the positivity appropriately.

These general and specific aspects may be implemented using a device, a system, a method, an integrated circuit, a computer program, or a computer-readable recording medium such as a CD-ROM, or any combination of devices, systems, methods, integrated circuits, computer programs, or computer-readable recording media.

Hereinafter, certain exemplary embodiments of the present disclosure are described in detail with reference to the drawings.

Each of the exemplary embodiments described below shows a general or specific example of the present disclosure. Accordingly, the numerical values, shapes, materials, constituent elements, the arrangement and connection of the constituent elements, processing steps (processes), the processing order of the processing steps etc. shown in the following exemplary embodiments are mere examples, and therefore do not limit the scope of the appended Claims and their equivalents. Therefore, among the constituent elements in the following exemplary embodiments, constituent elements not recited in any one of the independent claims are described as arbitrary constituent elements. It is to be noted that each of the drawings is a schematic diagram, and thus is not always illustrated precisely.

Embodiment 1

This embodiment describes an image measurement device capable of catching only spectral distributions of positive cell nuclei and negative cell nuclei included in a pathology specimen prepared from a sample of a lesion, identifying the positive cell nuclei and negative cell nuclei, etc. without being affected by color differences made due to differences made in the preparation of the pathology specimens, and thereby calculating a positivity of the positive cell nuclei.

Configuration

FIG. 1 is a block diagram of a configuration of an image measurement device 100 according to Embodiment 1.

The image measurement device 100 includes an illumination unit 101, an image obtaining unit 102, a memory unit 103, an illumination information storage unit 105, a calculating unit 106, a control unit 107, a staining method obtaining unit 110, an ortho-normalization unit 112, and an evaluation unit 113. The image measurement device 100 detects a positivity 111 of a pathology specimen 150 of an inspection target (inspection pathology specimen). The pathology specimen 150 is prepared by (i) slicing an example extracted from a lesion of a human body or the like to have a thickness (for example, 4 μm) so that the resulting slices allow light from the illumination unit 101 to pass therethrough and (ii) staining the slices.

Hereinafter, constituent elements of the image measurement device 100 are described.

Figure 2A:
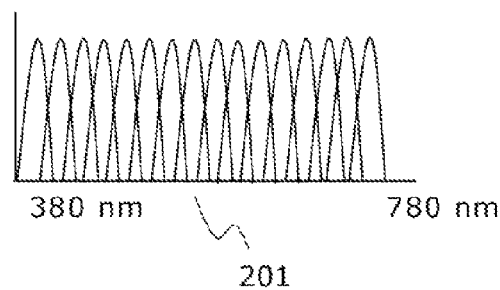
FIG. 2A is a diagram illustrating an example where a visible light region from 380 nm to 780 nm is divided into sixteen narrow bands.
Figure 2B:
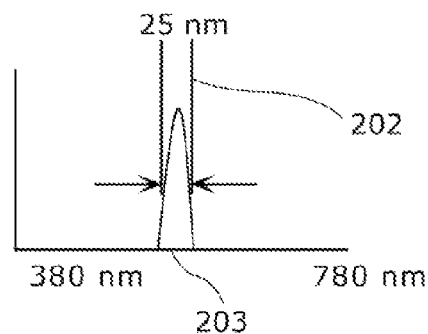
FIG. 2B is a diagram illustrating a half width of one of sixteen light beams.
Figure 2C:
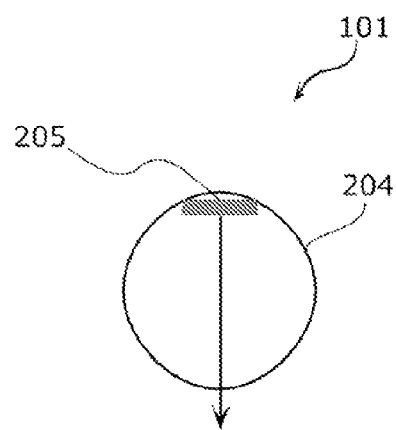
FIG. 2C is a diagram illustrating a configuration of an illumination unit configured in the form of an integrating sphere.

The illumination unit 101 includes a plurality of light sources (LEDs) that irradiate light beams having different peak wavelengths (central wavelengths). The light sources sequentially irradiate narrow-band light beams each close to a single color onto the pathology specimen 150. FIG. 2A illustrates an example obtained by dividing a visible light region 201 of 400 nm between 380 nm and 780 nm into sixteen narrow bands. For example, as illustrated in FIG. 2B, a half width 202 of a light beam of a single light source (LED) is approximately 25 nm (=400 nm/sixteen bands). When the sixteen LEDs having different central wavelengths 203 are arranged, illumination unevenness may be generated due to differences in the spatial positions of the sixteen LEDs. In order to prevent such illumination unevenness from being generated due to differences in the spatial positions of the sixteen LEDs, as illustrated in FIG. 2C, the sixteen LEDs 205 are covered by an integrating sphere 204 whose inner surface is fully coated with powder or the like having a high reflectivity. Although the illumination unit 101 described here includes the plurality of LEDs, the illumination unit 101 may be replaced with an illumination unit 101 including a plurality of illumination components for narrow bands (narrow-band light sources) other than the LEDs.

Figure 3:
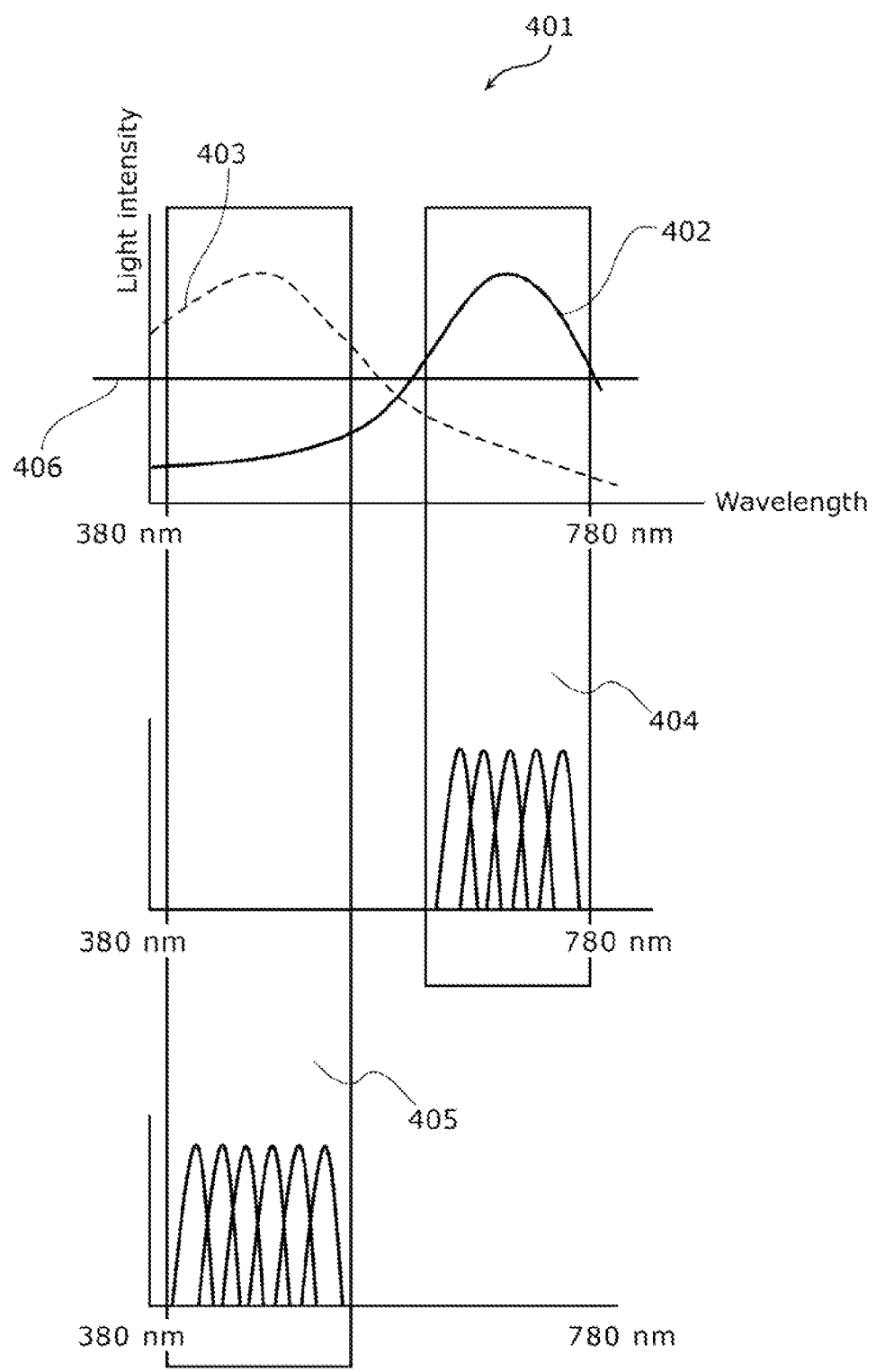
FIG. 3 is a diagram illustrating an example of spectral distributions of positive cell nuclei and negative cell nuclei.

The control unit 107 specifies, for the illumination unit 101, which one of the sixteen LEDs should be used, according to a staining method of a pathology specimen. The pathology specimen is largely composed of cell nuclei and cytoplasms. Hematoxylin-eosin staining is for staining one of these two in blue and the other in red. Immunostaining is for detecting an antigen in the pathology specimen using an antibody. For example, Ki-67 staining is performed to obtain a cell proliferation marker and a cell cycle marker, and to obtain positive stains in Stages G1, S, G2, and M other than a resting stage. Here, cell nuclei is classified into positive cell nuclei (hereinafter also referred to as "positive nuclei") stained in brown and negative cell nuclei (hereinafter also referred to as "negative nuclei") stained in blue violet. Thus, the pathology specimen is classified into three elements that are the positive cell nuclei and the negative cell nuclei, and cytoplasms. Spectral distributions 401 illustrated in FIG. 3 are examples of a spectral distribution of brown-stained positive nuclei 402 and a spectral distribution of blue-violet-stained negative nuclei 403. The positive nuclei 402 are represented in brown, and the spectral distribution of the positive nuclei 402 has a peak at a long wavelength side. Digital image data 109 of the positive nuclei can be obtained by capturing images of the negative nuclei with a light beam of a band 404 irradiated. On the other hand, the negative nuclei 403 are represented in blue violet, and the spectral distribution of the negative nuclei 403 has a peak at a short wavelength side. Digital image data 109 of the negative nuclei can be obtained by capturing images of the negative nuclei with light of a band 405 irradiated. In the examples of FIG. 3, each of the bands 404 and 405 have five peaks. Thus, in order to capture images of both the positive nuclei and negative nuclei with a sufficient image quality, images of these positive and negative nuclei are captured ten times with light beams irradiated from ten kinds of LEDs that are switched sequentially.

Figure 4:
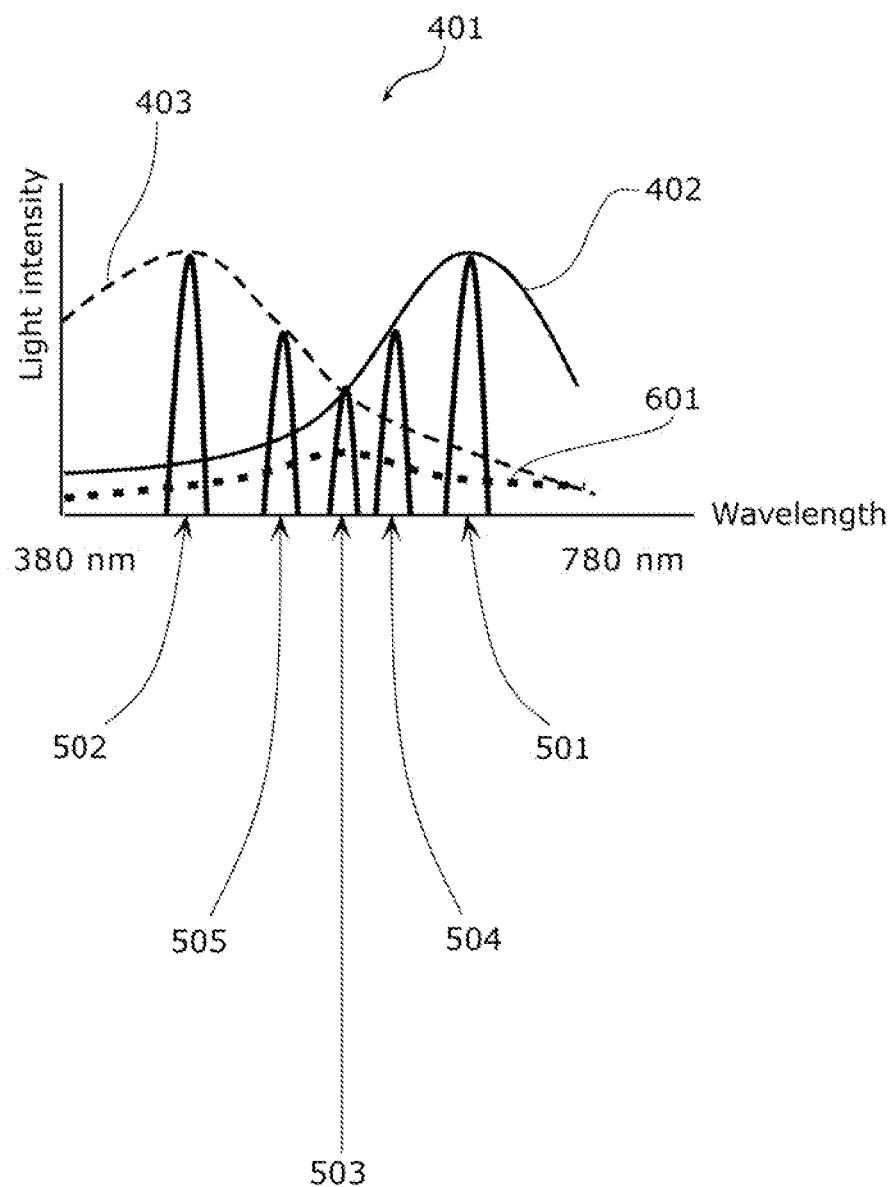
FIG. 4 is a diagram illustrating how to select illumination wavelengths of light emitting diode (LED) light sources according to the shapes of the spectral distributions.

With consideration of operability in a diagnosis, a smaller number of times of capturing images is preferable. However, when a fewer kinds of light beams to be irradiated (a fewer number of narrow-band light having different wavelength bands) are used, it is impossible to capture images of the cell nuclei. In order to achieve both a smallest number of times of capturing images and a high image quality, there is a need to select wavelengths for separately identifying the spectral distribution of the positive nuclei 402 and the spectral distribution of the negative nuclei 403 both represented in the spectral distribution 401. For example, as illustrated in FIG. 4, when an LED light beam corresponding to a peak wavelength 501 of the positive nuclei 402 is irradiated, the positive nuclei 402 present an increased light intensity, and can be clearly distinguished from the negative nuclei 403.

On the other hand, when an LED light beam corresponding to a peak wavelength 502 of the negative nuclei 403 is irradiated, the negative nuclei 402 present an increased light intensity, and can be clearly distinguished from the positive nuclei 402.

The pathology specimen 150 contains cytoplasms other than the positive nuclei and the negative nuclei. FIG. 4 also represents a spectral distribution of cytoplasms 601, other than the spectral distributions of the positive nuclei 402 and the negative nuclei 403. The cytoplasms 601 have a wavelength 503 as a peak wavelength, and thus the wavelength 503 is suitable for capturing the properties of the cytoplasms 601. However, when the wavelength 503 is used, the positive nuclei 402 and the negative nuclei 403 represent approximately the same light intensities. When a wavelength 504 and a wavelength 505 are added to the wavelength 503, the peak of the positive nuclei 402 and the peak of the negative nuclei 403 appear clearly.

By selecting suitable wavelengths for LEDs according to the spectral distributions included in the spectral distribution 401 as described above, it is possible to achieve both a smallest number of times of capturing images and a high image quality. In other words, it is possible to achieve both the smallest number of times of capturing images and the high image quality by selecting, from among the plurality of light sources (LEDs), a combination of light sources (LEDs) having different central wavelengths suitable for targets (positive nuclei, negative nuclei, cytoplasms, etc.) to be distinguished from each other.

The image measurement device 100 objectively selects LEDs (narrow-band illumination components) through linear evaluation according to Expression 1 for each of various kinds of staining methods for preparing pathology specimens. More specifically, the spectral distribution of the stained pathology specimen 150 is represented as a linear sum of ortho-normalization base vectors $e_i$ (i=1 to n), and a combination of light sources (LEDs) that irradiate narrow-band light beams for representing the linear sum most accurately is calculated. The combination of LEDs selected in this way is stored onto the illumination information storage unit 105 for each staining method, and is to be used individually in image measurement for calculating a positivity regarding an inspection pathology specimen. Hereinafter, information indicating a combination of LEDs associated with a staining method is referred to as illumination information.

[Math. 1]

$$S = a_1 e_1 + a_2 e_2 + a_3 e_3 + \ldots + a_n e_n \qquad \text{Expression 1}$$

Here, a vector S is a spectral distribution vector representing a spectral distribution of the pathology specimen 150. For example, the spectral distribution is digitized at measurement points such as measurement points 16, 24, 36, 41 etc., so as to be represented as a sixteen dimensional vector, a twenty-four dimensional vector, a thirty-six dimensional vector, or a forty-one dimensional vector. FIG. 4 illustrates the spectral distributions of the positive nuclei, negative nuclei, and cytoplasms in an overlapped manner. The spectral distribution of the pathology specimen 150 is measured as a sum of these spectral distributions, and, for example, is a spectral distribution 407 having a shape as in FIG. 5.

On the other hand, the right side of Expression 1 represents the spectral distribution vectors of the pathology specimen 150 as a linear sum of ortho-normalization base vectors $e_i$ (i=1 to n). The ortho-normalization base vectors $e_i$ (i=1 to n) are calculated as eigen vectors $B_i$ (i=1 to n) in Expression 2.

[Math. 2]

$$DB_1 = \lambda_1 B_1 \Leftrightarrow \begin{bmatrix} d_{380}^2 & d_{380,390} & \cdots & d_{380,790} \\ d_{380,390} & d_{390}^2 & \cdots & d_{390,790} \\ \vdots & \vdots & \ddots & \vdots \\ d_{380,790} & d_{390,790} & \cdots & d_{790}^2 \end{bmatrix} \quad \text{Expression 2}$$

$$\begin{bmatrix} b_{1,380} \\ b_{1,390} \\ \vdots \\ b_{1,780} \end{bmatrix} = \lambda_1 \begin{bmatrix} b_{1,380} \\ b_{1,390} \\ \vdots \\ b_{1,780} \end{bmatrix} \quad \begin{array}{l} DB_2 = \lambda_2 B_2 \\ \vdots \\ DB_{41} = \lambda_{41} B_{41} \end{array}$$

Here, D is a variance-covariance matrix of the spectral distribution vectors, and $\lambda_i$ (i=1 to n) are eigen values. The variance-covariance matrix D is given according to Expression 3. This is based on a variance of pixel data at a plurality of pixel positions in, for example, a plurality of images captured with narrow-band light beams irradiated. The eigen value $\lambda_i$ is obtained by solving Expression 4 having $\lambda$, and the solution values of $\lambda_1$, $\lambda_2$, and $\lambda_3$ are larger in this listed order. The eigen values $\lambda_i$ (i=1 to n) equal to the values of weights $a_i$ (i=1 to n) in Expression 1.

[Math. 3]

$$D = \begin{pmatrix} d_1^2 & d_1 d_2 & \cdots & d_1 d_{41} \\ d_1 d_2 & d_2^2 & \cdots & d_2 d_{41} \\ \vdots & \vdots & \ddots & \vdots \\ d_1 d_{41} & d_2 d_{41} & \cdots & d_{41}^2 \end{pmatrix} \quad \text{Expression 3}$$

[Math. 4]

$$\begin{vmatrix} d_1^2 - \lambda & d_1 d_2 & \cdots & d_1 d_{41} \\ d_1 d_2 & d_2^2 - \lambda & \cdots & d_2 d_{41} \\ \vdots & \vdots & \ddots & \vdots \\ d_1 d_{41} & d_2 d_{41} & \cdots & d_{41}^2 - \lambda \end{vmatrix} = 0 \quad \text{Expression 4}$$

Here, $d_i^2$ is a covariance, and $d_i d_j$ is a variance. In each of Expressions 2 to 4, the range of the visible light region is 400 nm starting at 380 nm and ending at 780 nm, and the visible light region is represented as 41-dimensional vectors (n=41) digitized on a per 10 nm basis.

The eigen vectors Bi (i=1 to n) that are ortho-normalization base vectors are orthogonal to each other, and have an independent relationship in which each of them cannot be represented using any one of the others. On the other hand, physically independent elements in the pathology specimen 150 are positive nuclei, negative nuclei, and cytoplasms. The spectral distribution 407 can be represented as a linear sum of three ortho-normalization base vectors $e_1$, $e_2$, and $e_3$ stemming from the positive nuclei, negative nuclei, and cytoplasms. Assuming that the right side of Expression 1 is a linear sum of the three ortho-normalization base vectors $e_1$, $e_2$, and $e_3$, it is possible to evaluate an optimum combination of LEDs by calculating the spectral distributions of light beams of narrow-band light sources that are most similar to the linear sum as a whole.

Here, Expression 5 is calculated. In Expression 5, a combined spectral distribution of light beams of the three LEDs is given instead of the vector S, and S is calculated using coefficients $a_1$, $a_2$, and $a_3$.

[Math. 5]

$$q = a_1^2 + a_2^2 + a_3^2 \quad \text{Expression 5}$$

When the evaluation value q is calculated as 1, the spectral distribution of the pathology specimen can be fully represented by the combination of LEDs. When the evaluation value q is calculated as less than 1, four or more ortho-normalization vectors $e_1$ are necessary because a necessary band in the spectral distribution of the pathology specimen 150 is not irradiated or an unnecessary band is irradiated, with regard to the spectral distribution of the pathology specimen 150. Here, it is possible to increase the image quality of the resulting image by calculating evaluation values q for all possible combinations of LEDs and selecting one of the combinations of LEDs whose evaluation value q is the largest among the evaluation values q. In this way, each evaluation value q is an indicator of the image quality of the resulting image.

Figures 6A, 6B:
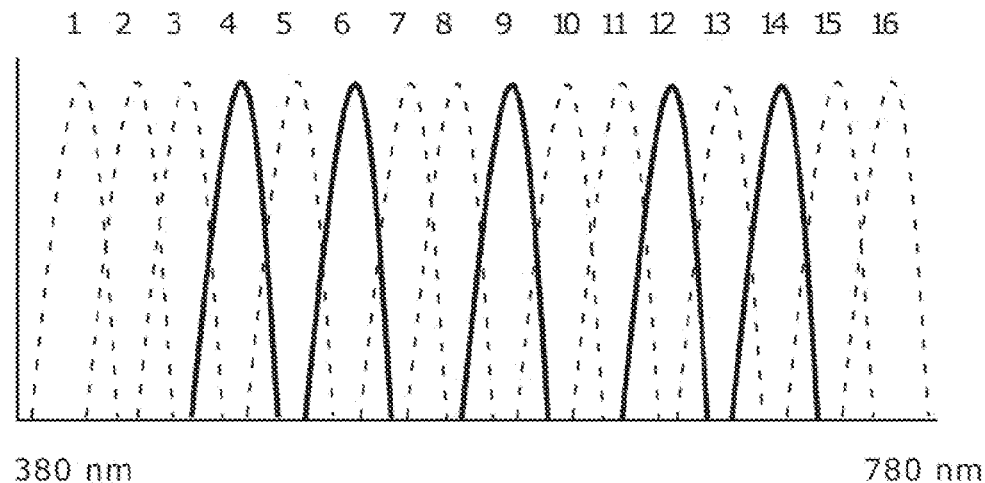
FIG. 6A is a diagram illustrating wavelength bands of the respective sixteen LED light beams.
FIG. 6B is an association table of LED combinations each made up of five LEDs and evaluation values q of the respective LED combinations.

For example, image data 109 is obtained by capturing images of the pathology specimen 150 five times with light beams of five LEDs among the sixteen LEDs irradiated therefrom. In this case, the following method is recommended. As illustrated in FIG. 6A, all of the combinations of five LEDs among the sixteen LEDs are calculated according to Expression 1 to find the combination whose evaluation value q in Expression 5 is the largest. A table 1101 in FIG. 6B represents examples of evaluation values q with respect to the combinations of LEDs. The table shows that the combination of five LEDs having LED numbers 4, 6, 9, 12, and 14 is the optimum combination.

The combination of LEDs calculated using the above method is stored onto the illumination information storage unit 105 as illumination information. There are fifty kinds of staining methods for preparing pathology specimens, and ortho-normalization base vectors $e_1$ are calculated for each staining method. The control unit 107 reads out the optimum combination of LEDs according to a given staining method based on illumination information of the illumination information storage unit 105, and gives instructions for turning on and off the light sources to the illumination unit 101.

In the case of FIGS. 6A and 6B, a first image of the pathology specimen 150 is captured by the image obtaining unit 102 with an LED light beam of the LED light source of No. 4 irradiated thereon, and image data 109 of the first image is written onto the memory unit 103. Next, a second image of the pathology specimen 150 is captured by the image obtaining unit 102 with an LED light beam of the LED light source of No. 6 irradiated thereon, and image data 109 of the second image is written onto the memory unit 103. The same processes are repeated five times in total with LED light beams of No. 9, 12, and 14 sequentially irradiated thereon. After the image data 109 of each of the five images are written onto the memory unit 103, the memory unit 103 outputs the image data 109 of the five images to the calculating unit 106 according to instructions from the control unit 107.

Here, the magnitude of the evaluation value q in Expression 5 denotes the image quality of the resulting image (a larger evaluation value q indicates a higher image quality). Accordingly, the magnitude of the evaluation value q indicates an appropriateness of the narrow-band light source for the spectral distribution of the pathology specimen 150.

Accordingly, it is possible to set a reference value qt for the appropriateness of the narrow-band light beam in advance, and to complete the evaluation of the narrow-band light source at the time when a combination of LEDs whose evaluation value q exceeds the reference value qt is found.

Three coefficients are used as non-limiting examples in Expression 5, and thus an arbitrary number of coefficients can be used. For example, when ribosome is added as a constituent element of a cell, the number of constituent elements is four. In addition, bones and red blood cells are also stained depending on body parts, the number of ortho-normalization base vectors at the right side of Expression 1 depends on a target sample and a use method.

The ortho-normalization unit 112 performs ortho-normalization of the spectral distribution of the stained pathology specimen 150 according to Expression 2. The spectral distribution of the stained pathology specimen 150 is measured by turning on all of the LEDs of the illumination unit 101 by time division.

FIG. 6A Illustrates an exemplary spectral distribution of the pathology specimen 150 obtained by capturing images of the pathology specimen 150 sixteen times with all of the LEDs of the illumination unit 101 turned on by time division.

The evaluation unit 113 evaluates the linearity of each of all the combinations of LEDs using Expression 5, and detects the largest one of the evaluation values q. Based on the result, the evaluation unit 113 stores, onto the illumination information storage unit 105, illumination information in which each of staining methods is associated with the optimum one of combinations of light sources.

Figure 7:
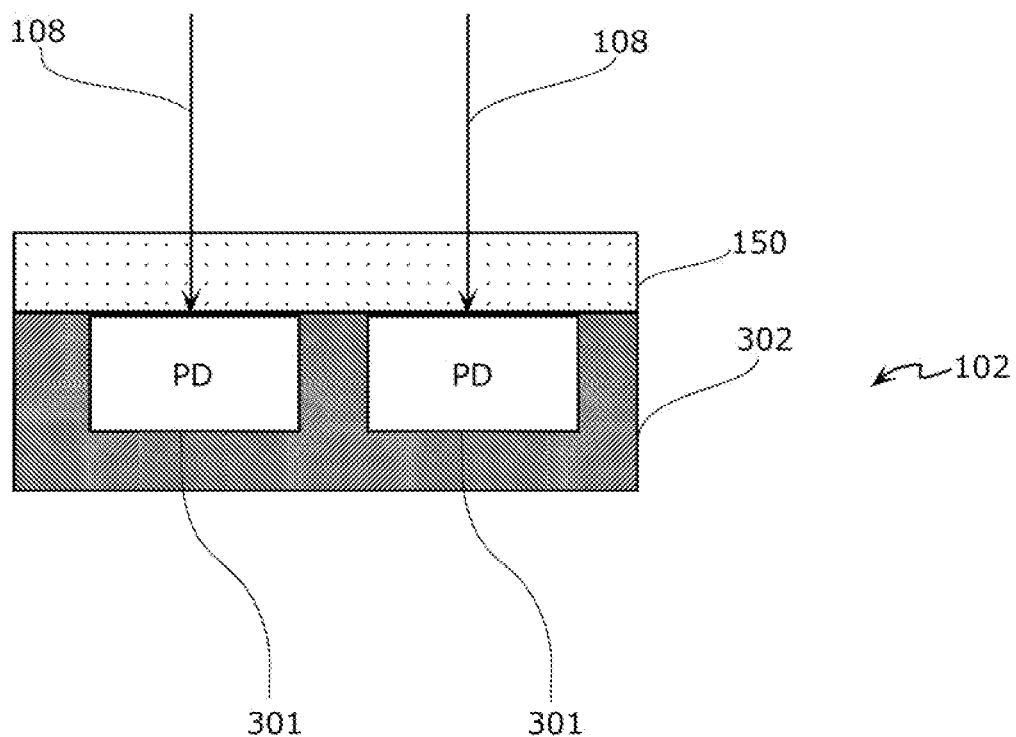
FIG. 7 is a diagram illustrating an exemplary configuration of an image obtaining unit.

As illustrated in FIG. 7, the image obtaining unit 102 is an image sensor 302 including photodiodes 301 that are examples of photo-electric conversion elements. The pathology specimen 150 is mounted on the image sensor 302. Images of the pathology specimen 150 are captured by the image obtaining unit 102 with narrow-band light beams 108 sequentially irradiated thereon, so that image data 109 of the images are obtained. The pathology specimen 150 is placed on the photodiodes 301 and under the illumination unit 101. For this reason, the image sensor 302 is capable of accurately measuring the spectral distribution of the pathology specimen 150. An image capturing system including a lens has an aberration, and thus an error is included in the measurement of the spectral distribution. The image obtaining unit 102 may be an arbitrary image sensor having a configuration different from the image sensor illustrated in FIG. 7.

The calculating unit 106 calculates a positivity that is an occupancy of the positive cell nuclei with respect to the whole cell nuclei, based on the image data 109 (inspection images) of the pathology specimen 150 (an inspection pathology specimen). One of examples of specific methods for calculating a positivity is a method for calculating, to be the positivity 111, a value obtained by dividing the number of pixels (a sum of areas of positive nuclei) determined to be of positive nuclei by the number of pixels determined to be of either the positive nuclei or negative nuclei (a sum of areas of the positive nuclei and negative nuclei. Alternatively, for example, the calculating unit 106 may calculate, to be a positivity 111, a value obtained by dividing the number of positive nuclei with a sum of the number of the positive nuclei and the number of the negative nuclei. The calculating unit 106 may calculate a positivity in a certain region range that satisfies a predetermined reference in the pathology specimen 150.

The staining method obtaining unit 110 accepts input of information indicating the staining method of the pathology specimen (the inspection pathology specimen), and provides the information indicating the staining method to the control unit 107.

The calculating unit 106, the control unit 107, the staining method obtaining unit 110, the ortho-normalization unit 112, and the evaluation unit 113 of the image measurement device 100 are realized by a computer including a memory, a processor, etc. In other words, the respective functions of the calculating unit 106, the control unit 107, the staining method obtaining unit 110, the ortho-normalization unit 112, and the evaluation unit 113 are realized by means of the processor executing the control program stored in the memory. The memory unit 103 is realized by the memory, and the illumination information storage unit 105 is implemented in the form of a recording medium that is a memory, a hard disc, or the like.

Operation

Hereinafter, descriptions are given of operations performed by the image measurement device 100 including the above-described constituent elements.

Figure 8:
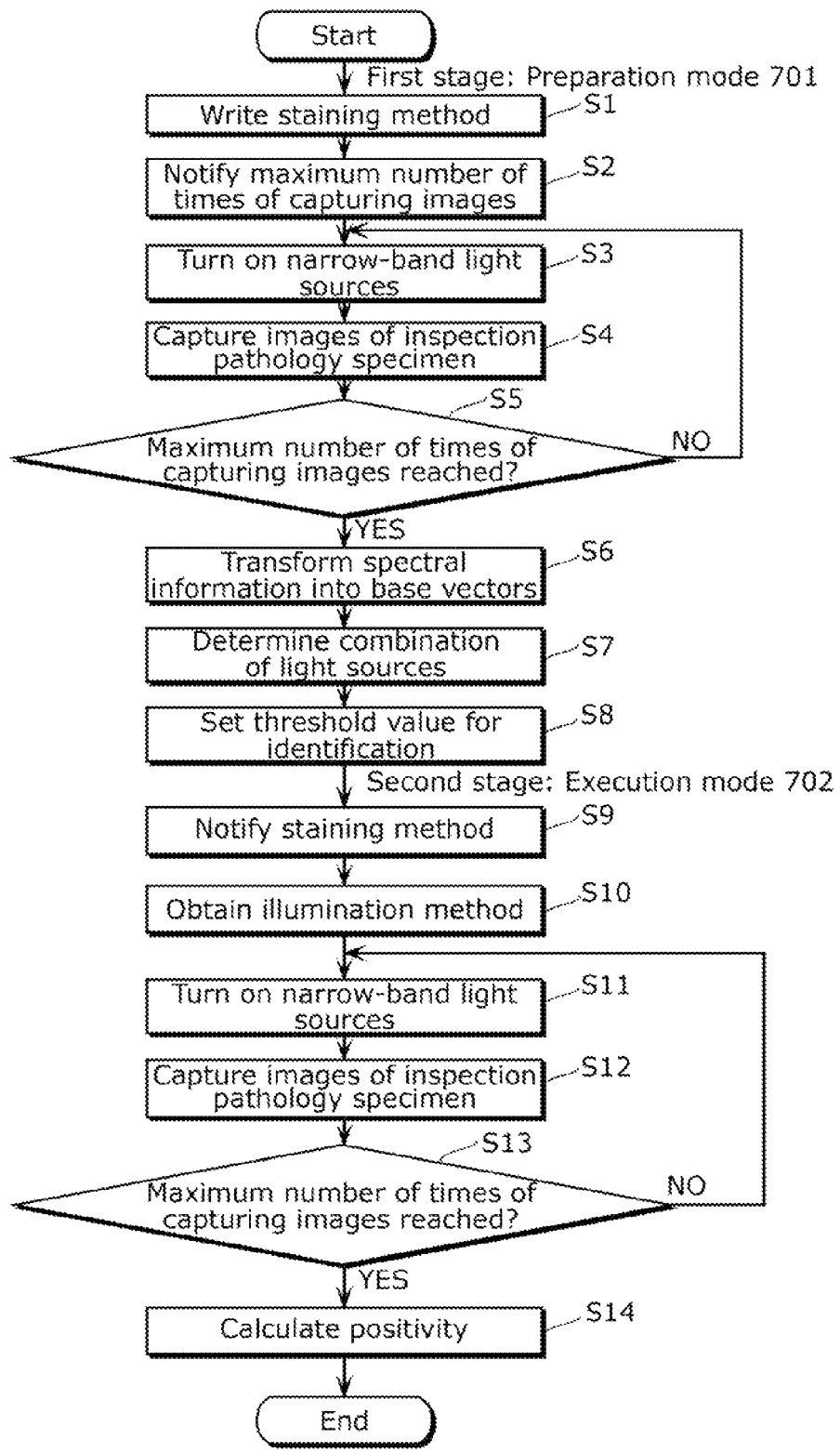
FIG. 8 is a flowchart of operations performed by the image measurement device.

FIG. 8 is a flowchart of operations performed by the image measurement device 100.

The operations by the image measurement device 100 are classified into two stages. In a preparation mode 701 that is a first stage, a combination of LEDs to be used to capture images of the pathology specimen 150 is determined. Specifically, LED numbers of the LEDs included in the determined combination are stored in the illumination information storage unit 105 as illumination information. In addition, a threshold value for identifying positive nuclei, negative nuclei, and cytoplasms is determined, and the threshold value is stored in the threshold value storage unit 114 in association with the staining method. In an execution mode 702 that is a second stage, the calculating unit 106 calculates a positivity 111.

The preparation mode 701 as the first stage corresponds to processing steps S1 to S8. The execution mode 702 as the second stage corresponds to processing steps S9 to S14.

The preparation mode 701 as the first stage may be executed repeatedly in order to store a combination of LEDs to be used to capture images of reference pathology specimens each prepared using a corresponding one of one or more staining methods onto the illumination information storage unit 105 as illumination information, and to store a threshold value for identifying positive nuclei etc. onto the threshold storage unit 114. The execution mode 702 as the second stage may be performed after the preparation mode 701 in order to calculate a positivity 111 of each arbitrary one of one or more inspection pathology specimens. In this case, the execution mode 702 as the second stage may be executed for each of the one or more inspection pathology specimens for which a positivity 111 should be calculated. It is to be noted that each reference pathology specimen may be a pathology specimen (an inspection pathology specimen) that is an actual inspection target or may be a pathology specimen that is not an actual inspection target.

Figure 9:
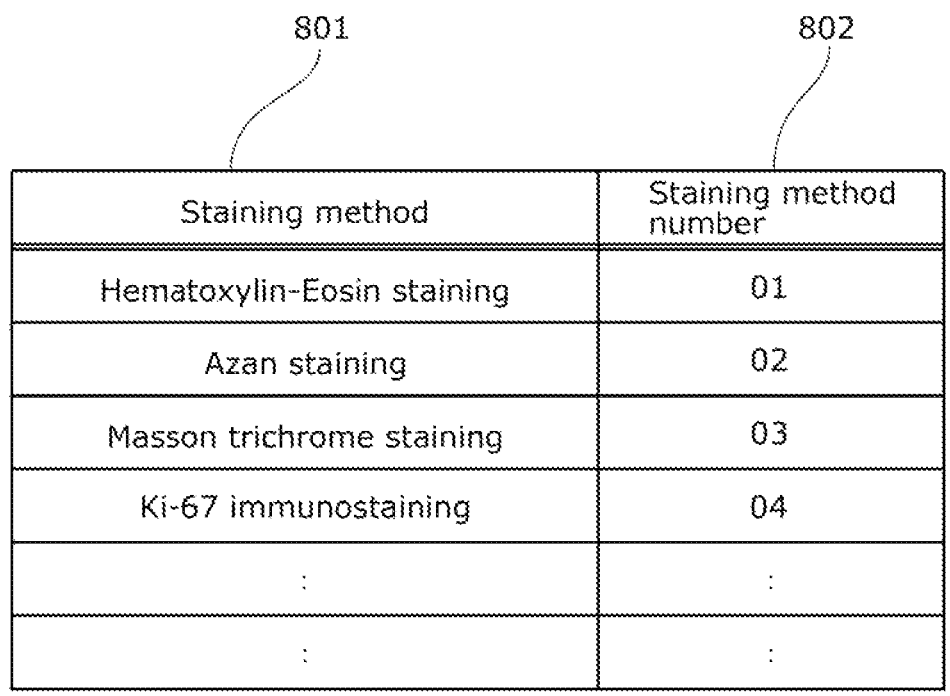
FIG. 9 is an association table of staining methods and staining method numbers thereof.

First, in the preparation mode 701 as the first stage, the control unit 107 of the image measurement device 100 writes the staining method of the pathology specimen 150 onto the illumination information storage unit 105 (processing step S1). As illustrated in FIG. 9, staining methods 801 and staining method numbers 802 are associated one to one with each other. The control unit 107 writes one of the staining method numbers 802 onto the illumination information storage unit 105 as the staining method 801 of the pathology specimen 150. The staining method number 802 of the pathology specimen 150 may be input by an operator (user) or the like of the image measurement device 100, and the control unit 107 may write the input staining method number 802 onto the illumination information storage unit 105.

Figure 5:
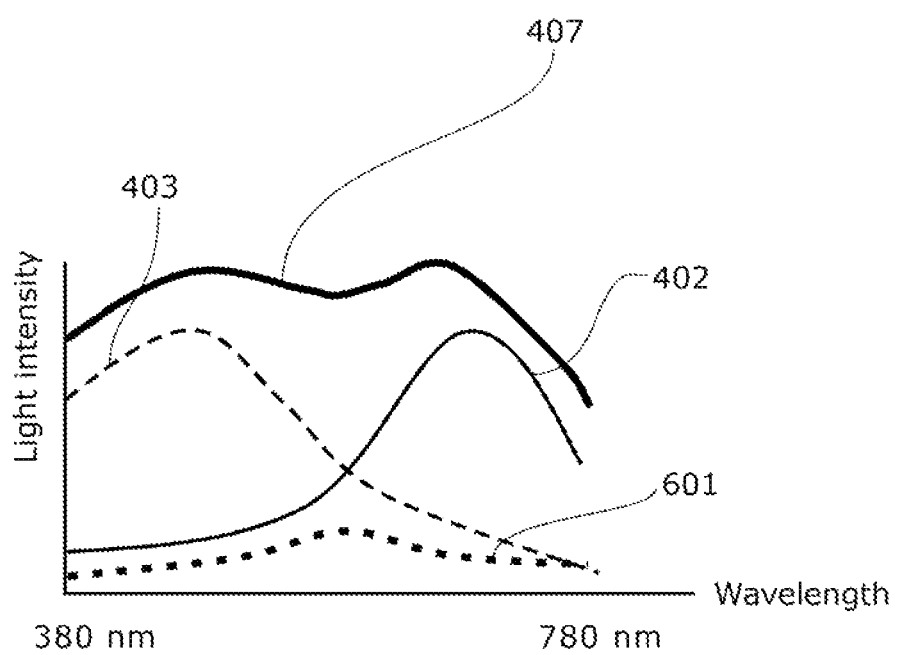
FIG. 5 is a diagram illustrating a spectral distribution of a pathology specimen.

Next, the control unit 107 notifies the ortho-normalization unit 112 of a maximum number of times of capturing images for measuring the spectral distributions of positive nuclei, negative nuclei, and cytoplasms (processing step S2). In the case of FIG. 5 in which sixteen kinds of LEDs are present, the spectral distribution of the pathology specimen 150 comprises sixteen measurement points, and the maximum number of times of capturing images is sixteen. The images of the pathology specimen 150 (reference pathology specimen) are captured by sequentially turning on the LEDs (narrow-band light sources) until the maximum number of times of capturing images is reached. When the maximum number of times of capturing images is reached, the ortho-normalization unit 112 reads the image data 109 from the memory unit 103 as will be described later.

The processing steps S3 and S4 are repeated under control of the control unit 107 until the maximum number of times of capturing images is reached. In other words, the control unit 107 notifies the illumination unit 101 of the LED number of the LED (narrow-band light source) that should be turned on next, and the illumination unit 101 turns on the LED (processing step S3). In other words, the control unit 107 gives an instruction to the illumination unit 101 so that it turns on the one of off LEDs among the sixteen kinds of LEDs. The illumination unit 101 turns on the specified LED. The control unit 107 gives an image-capture instruction to the image obtaining unit 102. The image obtaining unit 102 captures images of the pathology specimen 150, and writes the image data 109 of the captured images onto the memory unit 103 (processing step S4). Image capturing is repeated in this way while switching to a next LED (narrow-band light source) until the maximum number of times of capturing images is reached.

When the maximum number of times of capturing images is reached (YES in processing step S5), the ortho-normalization unit 112 writes the image data 109 stored in the memory unit 103. The ortho-normalization unit 112 transforms the spectral distribution of the pathology specimen 150 into base vectors according to Expression 2 (processing step S6). As illustrated in FIG. 4, it is necessary to separately measure the spectral distributions of the positive nuclei, negative nuclei, and cytoplasms. To satisfy the need, the positions of the positive nuclei, negative nuclei, and cytoplasms in the images (reference images) of the pathology specimen 150 are checked in advance, and the pixel values of the parts corresponding to the positive nuclei are counted to calculate the spectral distribution of the positive nuclei based on the pixel values. This is true of the negative nuclei and cytoplasms. Accordingly, the pathology specimen 150 that is used in the preparation mode 701 as the first stage is a reference pathology specimen. The inspection pathology specimen that is an actual inspection target is used in the execution mode 702 as the second stage. It is to be noted that a plurality of reference pathology specimens are prepared under different conditions that affect the resulting stains. For example, the plurality of reference pathology specimens are prepared under conditions different in the concentration of a fixative solution, a fixing time, a staining time, a room temperature, a humidity, etc. It is effective to collect specimens from a plurality of facilities that prepare pathology specimens because reagents or devices used are different between the facilities.

Next, the evaluation unit 113 determines the combination of LEDs (narrow-band light sources) that provides the highest linearity according to Expression 5 (processing step S7). The vector S that is a spectral distribution of light beams is given based on a combination of LEDs (narrow-band light sources). Here, the number of LEDs (narrow-band light sources) is determined. The number of LEDs (narrow-band light sources) corresponds to the maximum number of times of capturing images in the execution mode 702 as the second stage. The control unit 107 notifies the evaluation unit 113 of the maximum number of times of capturing images. For example, in the case of the pathology specimen 150 (the inspection pathology specimen) in FIG. 3, the maximum number of times of capturing images of the execution mode 702 as the second stage is five. For this reason, the evaluation unit 113 calculates an evaluation value q for each of the combinations of the five kinds of LEDs according to Expression 5 and selects the combination of five kinds of LEDs whose evaluation value q is the largest. The evaluation unit 113 stores the selected LED numbers of the five kinds of LEDs onto the illumination information storage unit 105. In this way, as illustrated in FIG. 6A, in the execution mode 702 as the second stage, for example, a first image is captured using a light beam having a band of No. 4, a second image is captured using a light beam having a band of No. 6, a third image is captured using a light beam having a band of No. 9 (see FIG. 6B). The illumination information storage unit 105 stores illumination information in which the staining methods (staining method numbers) written in processing step S1 and combinations of LEDs (LED numbers) written in processing step S7 are associated one to one with each other.

Figure 10:
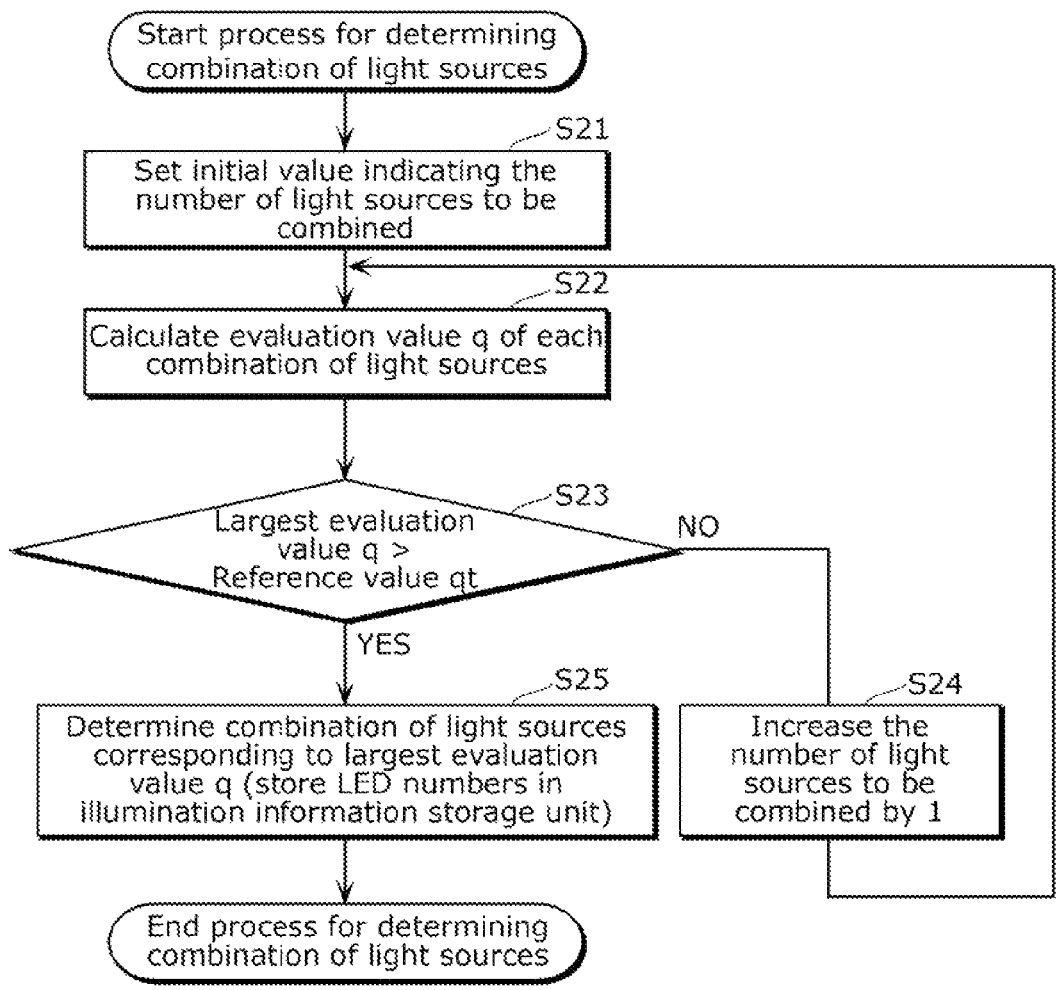
FIG. 10 is a flowchart of processes for determining a combination of light sources (LEDs).

In processing step S7, as an example, the number of LEDs (the number of LEDs to be used in combination) that are narrow-band light sources is fixedly determined as five (the maximum number of times of capturing images is five in the execution mode 702 as the second stage). Alternatively, it is possible to use a method for dynamically determining the number of LEDs to be used in combination. FIG. 10 is a flowchart of processes for determining a combination of LEDs according to the alternative method. With reference to the diagram, the processes for determining the combination of LEDs are described.

The evaluation unit 113 sets an initial value indicating the number of LEDs that are narrow-band light sources (processing step S21). For example, as described above, the pathology specimen 150 sets five in the case of FIG. 3. It is to be noted that a small number such as 2 or the like may be set uniformly as an initial value. The evaluation unit 113 calculates an evaluation value q in Expression 5 for each of the LEDs (light sources) (processing step S22). The evaluation unit 113 compares the largest one of calculated evaluation values q with a reference value qt that has been set in advance (processing step S23). When the largest evaluation value q does not exceed the reference value qt, the number of LEDs (light sources) to be combined is incremented by 1 (processing step S24). For example, 1 is added to 5 to obtain 6. The evaluation value 113 repeatedly executes processing step S22 for calculating an evaluation value q for each of combinations of the resulting number of LEDs (for example, six LEDs) according to Expression 5. Until it is determined that a largest evaluation value q exceeds the reference value qt in processing step S23, the evaluation value 113 repeats processing steps S24 and S22. When it is determined that the largest evaluation value q exceeds the reference value qt in processing step S23, the evaluation value 113 determines the combination of light sources (LEDs) corresponding to the largest evaluation value q, and stores the LED numbers of the LEDs onto the illumination information storage unit 105 (processing step S25). In other words, the determined combination is the combination of the smallest number of light sources among combinations of light sources whose evaluation value q exceeds the reference value qt. In this way, it is possible to capture images having an image quality higher than the reference value qt using such a reduced number of light sources.

Returning to FIG. 8, the flowchart is further described below.

Next to processing step S7, the calculating unit 106 determines a threshold value for identifying positive nuclei, negative nuclei, and cytoplasms, and stores the threshold value onto the threshold storage unit 114 (processing step S8). The threshold value is set for each staining method. A method for determining a threshold value is arbitrary. In general, a threshold value is to be set at a position most distant from a plurality of identification targets. For example, in the graph of FIG. 3, the threshold value 406 is at the midpoint of the spectral distribution of the positive nuclei 402 and the spectral distribution of the negative nuclei 403 in each of the band 404 and the band 405. For this reason, it is possible to stably divide the positive nuclei 402 and the positive nuclei 403 using the threshold value 406. In the execution mode 702 as the second stage, five images (inspection images) are captured using the five kinds of LEDs. One of the images may be used for such processing using a threshold value, or an image obtained by adding some or all of the five images may be used for such processing using a threshold value. The point that the present disclosure guarantees is that the spectral distributions of positive nuclei 402 and negative nuclei 403 in a stained inspection pathology specimen 150 are accurately obtained using such a threshold value. Thus, arbitrary processing using a threshold value may be applied to the spectral distributions.

The execution mode 702 as the second stage starts with the processing step S9, and the control unit 107 manages the execution mode 702.

In the execution mode 702 as the second stage, a positivity is calculated for each of arbitrary pathology specimens 150 (inspection pathology specimens).

First, the staining method obtaining unit 110 receives an input of the staining method from outside, and notifies the control unit 107 of the staining method (processing step S9). For example, the staining method number (see FIG. 9) of the staining method of the pathology specimen 150 for which a positivity should be calculated is input by an operator (user) or the like of the image measurement device 100. Then, the staining method obtaining unit 110 notifies the control unit 107 of the staining method number.

Next, the control unit 107 obtains, from the illumination information storage unit 105, an illuminating method corresponding to the staining method (the staining method number) received by the staining method obtaining unit 110 (processing step S10). Here, the illuminating method corresponds to a combination of five kinds of LEDs.

The processing steps S11 and S12 are repeated under control of the control unit 107 until the maximum number of times of capturing images (here, the number of LEDs to be used in combination is five) is reached. More specifically, the control unit 107 notifies the illumination unit 101 of the LED number of an LED to be turned on next (the LED number of an off LED in the combination of LEDs) according to the combination of LEDs obtained in processing step S10, and the illumination unit 101 turns on the LED (narrow-band light source) (processing step S11). In other words, the control unit 107 gives an instruction to the illumination unit 101 so that it turns on the off LED among the five kinds of LEDs. The illumination unit 101 turns on the specified kind of LED according to the instruction. The control unit 107 gives an image-capture instruction to the image obtaining unit 102. The image obtaining unit 102 captures images of the pathology specimen 150, and writes the resulting image data 109 (inspection images) of the captured images onto the memory unit 103 (processing step S12). An image is captured repeatedly in this way while switching to a next LED (narrow-band light source) until the maximum number of times of capturing images is reached.

When the maximum number of times of capturing images is reached (YES in processing step S13), the calculating unit 106 calculates a positivity in the pathology specimen 150 (inspection pathology specimen) under control of the control unit 107 (processing step S14). More specifically, the control unit 107 notifies the calculating unit 106 of the staining method (the staining method number), and the calculating unit 106 reads a threshold value corresponding to the staining method from the threshold value storage unit 114. Next, the calculating unit 106 reads all of the image data 109 stored in the memory unit 103. The calculating unit 106 determines positive nuclei and negative nuclei by processing the read-out image data 109 using the read-out threshold value. The calculating unit 106 calculates, as a positivity 111, a value obtained by dividing the number of pixels determined to be pixels representing the positive nuclei (the sum of the areas of the positive nuclei) by the number of pixels determined to be pixels representing either the positive nuclei or the negative nuclei (the sum of the areas of the positive nuclei and the areas of the negative nuclei).

According to this embodiment, the spectral distribution of the pathology specimen 150 is represented as a linear sum of ortho-normalization base vectors, and a combination of LEDs that irradiate narrow-band light beams for representing the linear sum most accurately is calculated. Accordingly, it is possible to calculate positivities using a fixed threshold value database irrespective of color differences made due to differences made in the preparation processes of pathology specimens.

Embodiment 2

In this embodiment, a description is given of an image measurement device 1000 obtained by modifying part of the image measurement device 100 in Embodiment 1. In this embodiment, in particular, it is possible to accurately determine the state of stains in a pathology specimen 150 without being affected particularly by characteristics of light sources and image sensors, and thereby calculating a positivity in the pathology specimen 150.

Figure 11:
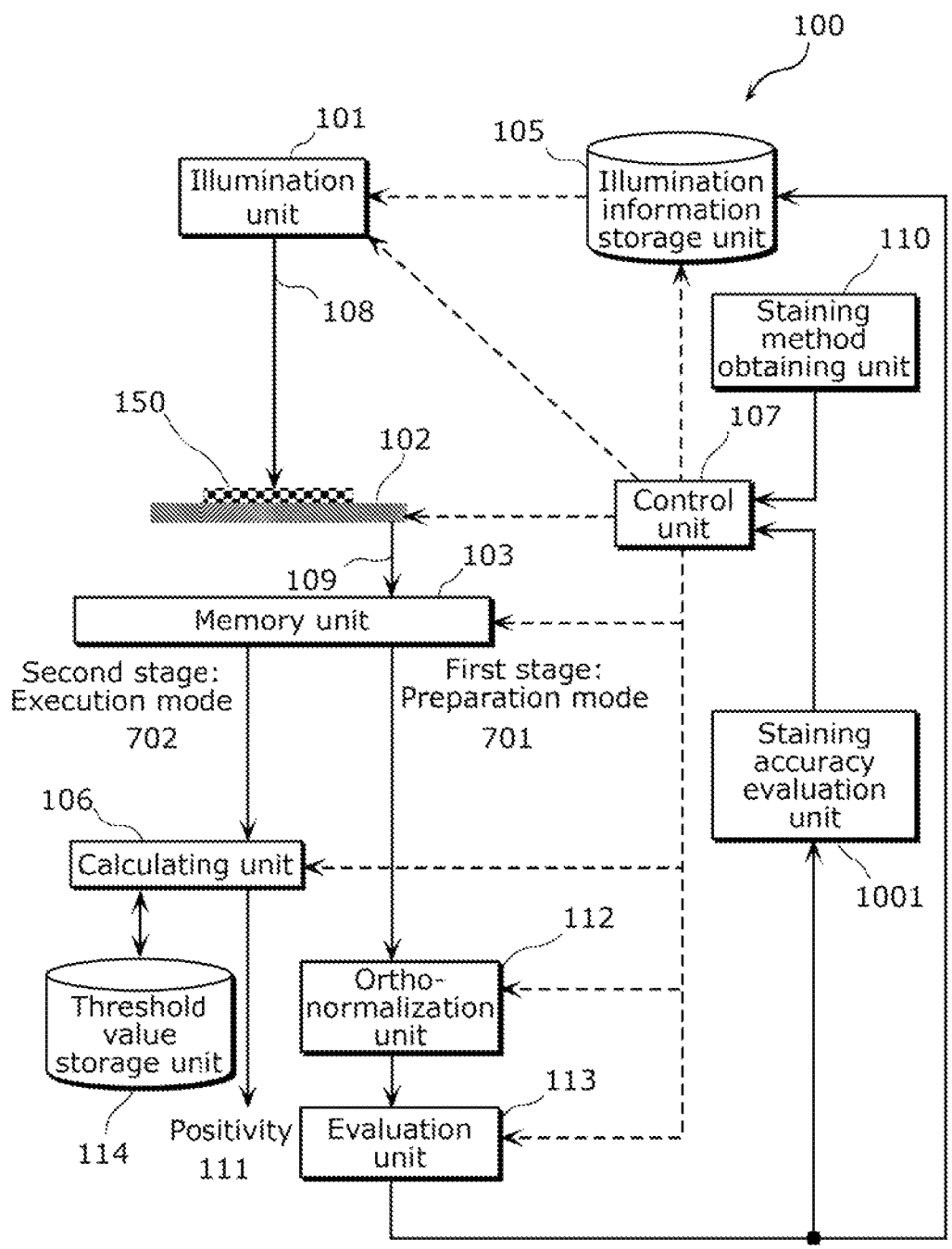
FIG. 11 is a block diagram of a configuration of an image measurement device according to Embodiment 2.

FIG. 11 is a block diagram of a configuration of an image measurement device according to Embodiment 2. The same constituent elements as in FIG. 1 are assigned with the same reference numerals, and are not described in detail.

The image measurement device 1000 further Includes a staining accuracy evaluation unit 1001 in addition to the configuration of the image measurement device 100 illustrated in FIG. 1.

The staining accuracy evaluation unit 1001 evaluates noise characteristics of the light sources and image sensors. More specifically, the staining accuracy evaluation unit 1001 evaluates a staining accuracy of the pathology specimen 150 (inspection pathology specimen) as an inspection target, based on an evaluation value q in Expression 5. As described earlier, the evaluation value q in Expression 5 is used to determine bands of light beams. More specifically, a reference pathology specimen is mounted on an image obtaining unit 102, and the combination of LEDs whose evaluation value q obtained according to Expression 5 is the largest is identified. Supposing that the states of stains in an inspection pathology specimen are different from those of the reference pathology specimen, the evaluation value q of the inspection pathology specimen cannot be the largest value. Making most of such properties, the following processes are performed: evaluation values q calculated using the reference pathology specimen when determining the LEDs to be used as light sources are stored onto the illumination information storage unit 105 in advance; and the staining accuracy evaluation unit 1001 evaluates the staining accuracy of the pathology specimen 150 (inspection pathology specimen) by comparison between each of the evaluation values q stored in the illumination information storage unit 105 and each of evaluation values q calculated from the pathology specimen as the inspection target (inspection pathology specimen). More specifically, when the difference between two evaluation values q is larger than a threshold value, the staining accuracy evaluation unit 1001 determines that the difference indicates a staining failure. In this case, the control unit 107 stops a positivity measurement process, and gives an instruction for preparing another specimen. The positivity measurement process is stopped by means of, for example, the control unit 107 giving a process-stop instruction to the illumination unit 101, the image obtaining unit 102, and the calculating unit 106, and the respective units stopping their processes in response to the process-stop instruction. On the other hand, when the difference between evaluation values q is smaller than or equal to the threshold value, the difference between the stains are determined to be within an allowable range, and a step of calculating a positivity is performed next. The threshold value is determined in advance as a staining accuracy such that it indicates the upper limit of the allowable range.

The evaluation value q of image data (inspection image) of the pathology specimen 150 (inspection pathology specimen) is calculated according to a method similar to the method for calculating the evaluation value q from the image data (reference image) of the reference pathology specimen.

Although it is possible to determine differences between the stains of the pathology specimens using the above-described method, there is a need to avoid influence of fluctuation in the intensity of light beams and noise of image sensors.

Figure 12:
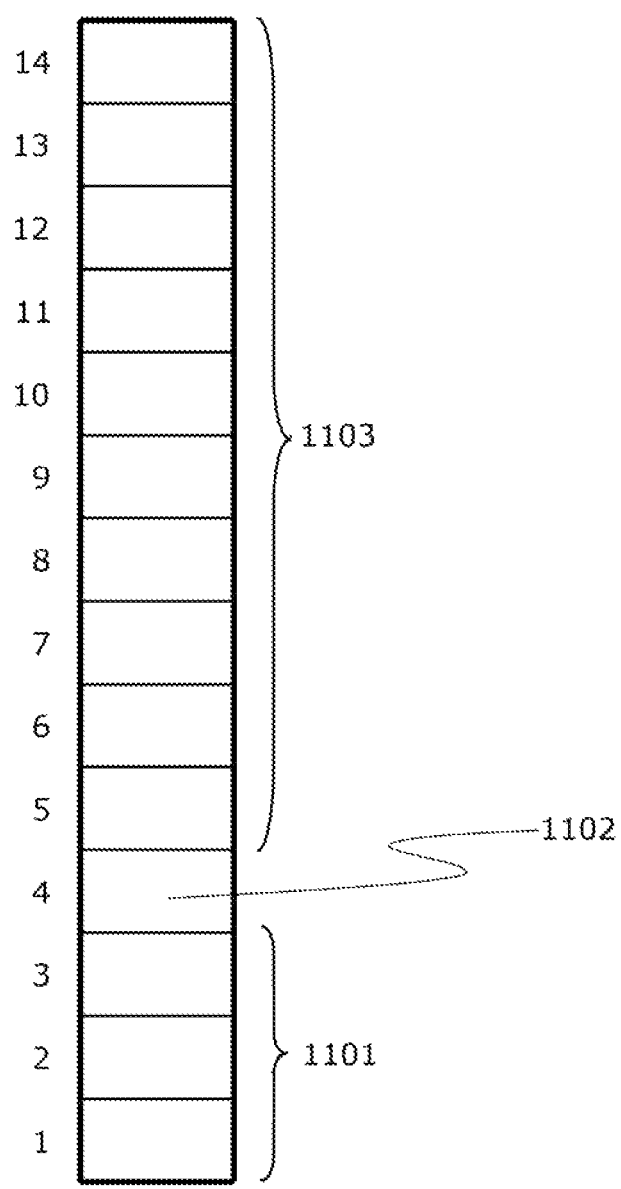
FIG. 12 is an illustration of an exemplary image data whose most significant bits are valid data.

For this reason, as illustrated in FIG. 12, it is effective to use, as effective data, only the most significant bits of the pixel data of the image data 109. The image data 109 generated in the image capturing by the image obtaining unit 102 is a set of pixel data arranged two-dimensionally. Here, it is assumed that the bit depth (bit length) of the respective pixel data of the image data 109 is 14 bits. The image data 109 (the set of pixel data) is recorded in 14-bit grayscale representation onto the memory unit 103.

Since fluctuation in the intensity of a light beam and noise etc. of image sensors are normally minute, and thus appear, for example, in the least significant 3 bits (1101) of the 14-bit data. For this reason, the data having a magnitude of an integer ranging from 0 to 7 in decimal representation in the pixel data of the image data 109 is regarded as noise. In other words, only the most significant 11 bits are determined to be effective among the 14-bit data of each pixel of the image data 109. Furthermore, the forth bit from the bottom (1102) is regarded as an allowable-level bit, and may be excluded from the effective data for error reduction. In this case, the data of the most significant 10 bits (1103) in each pixel is effective. The values indicating the number of bits, noise levels and allowable levels of the above-described image data 109 are mere examples, and may be other values.

According to this embodiment, it is possible to absorb color differences between pathology specimens made due to differences made in the preparation of the specimens, and to thereby calculate positivities with high accuracy. In particular, it is possible to separate differences made in the preparation of the specimens and differences between measurement devices (such as light sources and image sensors). Furthermore, it is possible to represent the differences between the pathology specimens as numerical values, and to support pathological diagnoses quantitatively and objectively.

Other Embodiments

Embodiments 1 and 2 have been described as exemplary embodiments of the present disclosure. However, the respective embodiments described above are mere examples, and thus the present disclosure is not limited to the embodiments. The present disclosure covers, for example, (i) embodiments obtained by adding various kinds of modification, replacement, addition, deletion that a person skilled in the art will arrive at based on the constituent elements and functions described in the embodiments above, and (ii) embodiments realized by arbitrarily combining the constituent elements and functions.

Figure 13:
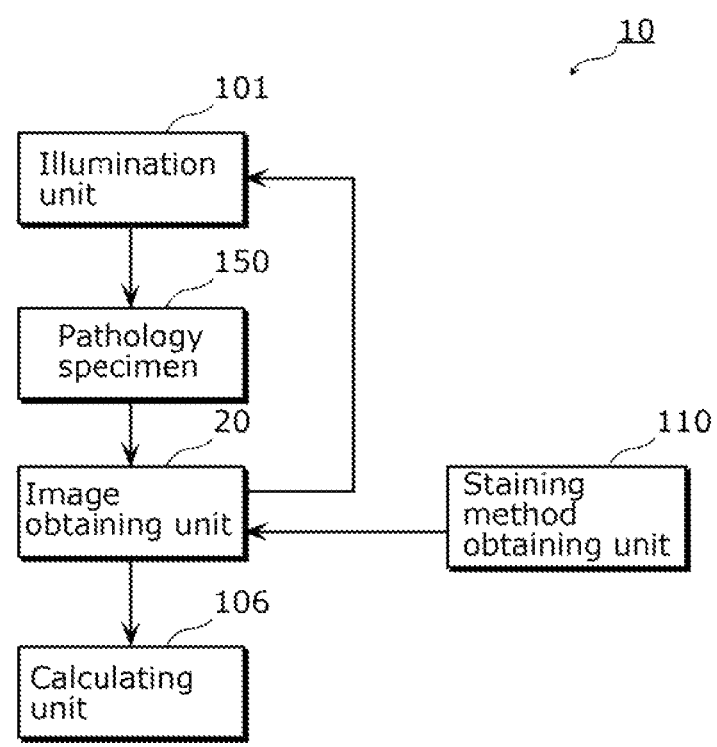
FIG. 13 is a block diagram of a configuration of an image measurement device according to one of the other embodiments.

Two or more of the constituent elements of the image measurement device illustrated in Embodiments 1 and 2 may be integrated, or one of them may be divided into a plurality of constituent elements (functional units). For example, the image obtaining unit 102 and the control unit 107 may be implemented as an image obtaining unit 20 as indicated below. The image obtaining unit 20 has functions of obtaining inspection images by (i) selecting a combination of light sources according to the staining method indicated by information obtained by the staining method obtaining unit 110 among a plurality of light sources (LEDs) in an illumination unit 101, based on illumination information in which each of one or more staining methods including the staining method is associated with a corresponding one of one or more combinations of light sources including the combination of light sources, and (ii) capturing inspection images with light beams sequentially irradiated from the selected light sources. FIG. 13 illustrates a configuration of an image measurement device 10 of the image obtainment unit 20. In this case, the calculating unit 106 calculates a positivity that is the percentage of positive cell nuclei with respect to cell nuclei in the inspection pathology specimen, based on the inspection image obtained by the image obtaining unit 20.

Each of the constituent elements in each of the above-described embodiments may be configured in the form of an exclusive hardware product, or may be realized by executing a software program suitable for the structural element. Each of the constituent elements may be realized by means of a program executing unit, such as a CPU and a processor, reading and executing the software program recorded on a recording medium such as a hard disk or a semiconductor memory. Here, the software program for realizing the image measurement device according to each of the embodiments is a program described below.

Functions of the staining method obtaining unit, the image obtaining unit, and the calculating unit may be realized by means of a computer executing software (a program) or may be executed by hardware. The software is, for example, a control program as below.

The control program causes a computer that controls an illumination unit including a plurality of light sources that irradiate light beams having different peak wavelengths to execute the following image measurement method including: obtaining information indicating a staining method of an inspection pathology specimen; selecting a combination of light sources included in the plurality of light sources in the illumination unit according to the staining method indicated by the information obtained in the obtaining, based on illumination information in which each of one or more staining methods including the staining method is associated with a corresponding one of one or more combinations of light sources including the combination of light sources; capturing inspection images of the inspection pathology specimen with light beams sequentially irradiated from the respective light sources in the selected combination, and capture reference images of a reference pathology specimen with light beams sequentially irradiated from the respective light sources included in the plurality of light sources; calculating a positivity that is a percentage of positive cell nuclei in the inspection pathology specimen, based on the inspection images obtained in the obtaining; forming a plurality of spectral distribution vectors from the reference images, and calculating an ortho-normalization base vector from the plurality of spectral distribution vectors; and associating the staining method of the reference pathology specimen with the combination of light sources to generate the illumination information, and storing the illumination information in a recording medium, the combination of light sources having an evaluation value that exceeds a reference value or is largest among evaluation values of combinations of light sources in the illumination unit, each evaluation value being a total value of coefficients of ortho-normalization base vectors included in a linear sum of the ortho-normalization base vectors when a spectral distribution of the illumination unit is represented as the linear sum.

Furthermore, the control program may be recorded in a recording medium and distributed or circulated. For example, the distributed control program is installed in a device or the like such as a computer and executed by a processor of the device or the like. In this way, the device or the like can execute the functions of the above-described constituent elements.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The image measurement device and the image measurement method according to one or more exemplary embodiments disclosed herein are applicable to image measurement devices and image measurement methods for calculating positivities from inspection pathology specimens

The invention claimed is:

1. An image measurement device comprising:
an illumination unit including a plurality of light sources that irradiate light beams having different peak wavelengths;
a staining method obtaining unit configured to obtain information indicating a staining method of an inspection pathology specimen;
an image obtaining unit configured to:
select a combination of light sources included in the plurality of light sources in the illumination unit according to the staining method indicated by the information obtained by the staining method obtaining unit, based on illumination information in which each of one or more staining methods including the staining method is associated with a corresponding one of one or more combinations of light sources including the combination of light sources; and
capture inspection images of the inspection pathology specimen with light beams sequentially irradiated from the respective light sources in the selected combination, and capture reference images of a reference pathology specimen with light beams sequentially irradiated from the respective light sources included in the plurality of light sources;
a calculating unit configured to calculate a positivity that is a percentage of positive cell nuclei in the inspection pathology specimen, based on the inspection images obtained by the image obtaining unit;
an ortho-normalization unit configured to form a plurality of spectral distribution vectors from the reference images, and calculate an ortho-normalization base vector from the plurality of spectral distribution vectors; and
an evaluation unit configured to associate the staining method of the reference pathology specimen with the combination of light sources to generate the illumination information, and store the illumination information in a recording medium, the combination of light sources having an evaluation value that exceeds a reference value or is largest among evaluation values of combinations of light sources in the illumination unit, each evaluation value being a total value of coefficients of ortho-normalization base vectors included in a linear sum of the ortho-normalization base vectors when a spectral distribution of the illumination unit is represented as the linear sum.

2. The image measurement device according to claim 1, wherein the evaluation unit is configured to associate the staining method of the reference pathology specimen with a combination having a smallest number of light sources among a plurality of the combinations of light sources having an evaluation value exceeding the reference value when generating the illumination information, and store the illumination information in the recording medium.

3. The image measurement device according to claim 1, wherein the ortho-normalization unit is further configured to form a plurality of spectral distribution vectors from the inspection images obtained by the image obtaining unit, and calculate ortho-normalization base vectors from the plurality of spectral distribution vectors, and the evaluation unit is further configured to calculate an evaluation value that is a total value of coefficients of the ortho-normalization base vectors included in a linear sum of the ortho-normalization base vectors, when a spectral distribution of the illumination unit is represented as the linear sum of the ortho-normalization base vectors calculated from the inspection images, the image measurement device further comprising:

a staining accuracy evaluation unit configured to determine whether or not a difference between the evaluation value calculated from the reference images and the evaluation value calculated from the inspection images is larger than a threshold value; and a control unit configured to transmit a process-stop instruction to each of the illumination unit, the image obtaining unit, and the calculating unit when the difference is larger than the threshold value.

4. The image measurement device according to claim 3, wherein the ortho-normalization unit is configured to form the spectral distribution vectors from the reference images and form the spectral distribution vectors from the inspection images, using significant bit data obtained by excluding data of a predetermined number of bits starting with a least significant bit in each of image pixel data of a corresponding one of the reference images and the inspection images.

5. The image measurement device according to claim 1, wherein the image obtaining unit includes a photo-electric conversion element on which the inspection pathology specimen is mounted, and is configured to obtain the inspection images by means of the photo-electric conversion element receiving light irradiated from the illumination unit and passed through the inspection pathology specimen.

6. An image measurement method for capturing images using light beams irradiated from an illumination unit including a plurality of light sources that irradiate light beams having different peak wavelengths, the image measurement method comprising:

obtaining information indicating a staining method of an inspection pathology specimen;

selecting a combination of light sources included in the plurality of light sources in the illumination unit according to the staining method indicated by the information obtained in the obtaining, based on illumination information in which each of one or more staining methods including the staining method is associated with a corresponding one of one or more combinations of light sources including the combination of light sources;

capturing inspection images of the inspection pathology specimen with light beams sequentially irradiated from the respective light sources in the selected combination, and capture reference images of a reference pathology specimen with light beams sequentially irradiated from the respective light sources included in the plurality of light sources;

calculating a positivity that is a percentage of positive cell nuclei in the inspection pathology specimen, based on the inspection images obtained in the obtaining;

forming a plurality of spectral distribution vectors from the reference images, and calculating an ortho-normalization base vector from the plurality of spectral distribution vectors; and associating the staining method of the reference pathology specimen with the combination of light sources to generate the illumination information, and storing the illumination information in a recording medium, the combination of light sources having an evaluation value that exceeds a reference value or is largest among evaluation values of combinations of light sources in the illumination unit, each evaluation value being a total value of coefficients of ortho-normalization base vectors included in a linear sum of the ortho-normalization base vectors when a spectral distribution of the illumination unit is represented as the linear sum.

7. A non-transitory computer-readable recording media having a control program recorded thereon, the control program causing a computer to execute an image measurement method, the computer controlling an illumination unit including a plurality of light sources that irradiate light beams having different peak wavelengths, the image measurement method including:

obtaining information indicating a staining method of an inspection pathology specimen;

selecting a combination of light sources included in the plurality of light sources in the illumination unit according to the staining method indicated by the information obtained in the obtaining, based on illumination information in which each of one or more staining methods including the staining method is associated with a corresponding one of one or more combinations of light sources including the combination of light sources;

capturing inspection images of the inspection pathology specimen with light beams sequentially irradiated from the respective light sources in the selected combination, and capture reference images of a reference pathology specimen with light beams sequentially irradiated from the respective light sources included in the plurality of light sources;

calculating a positivity that is a percentage of positive cell nuclei in the inspection pathology specimen, based on the inspection images obtained in the obtaining;

forming a plurality of spectral distribution vectors from the reference images, and calculating an ortho-normalization base vector from the plurality of spectral distribution vectors; and associating the staining method of the reference pathology specimen with the combination of light sources to generate the illumination information, and storing the illumination information in a recording medium, the combination of light sources having an evaluation value that exceeds a reference value or is largest among evaluation values of combinations of light sources in the illumination unit, each evaluation value being a total value of coefficients of ortho-normalization base vectors included in a linear sum of the ortho-normalization base vectors when a spectral distribution of the illumination unit is represented as the linear sum.

* * * * *